Jan. 30, 1962  J. F. SPIELMAN  3,019,050
AIRCRAFT SEATS AND AIRCRAFT SEATING
Filed Feb. 15, 1960  3 Sheets-Sheet 2
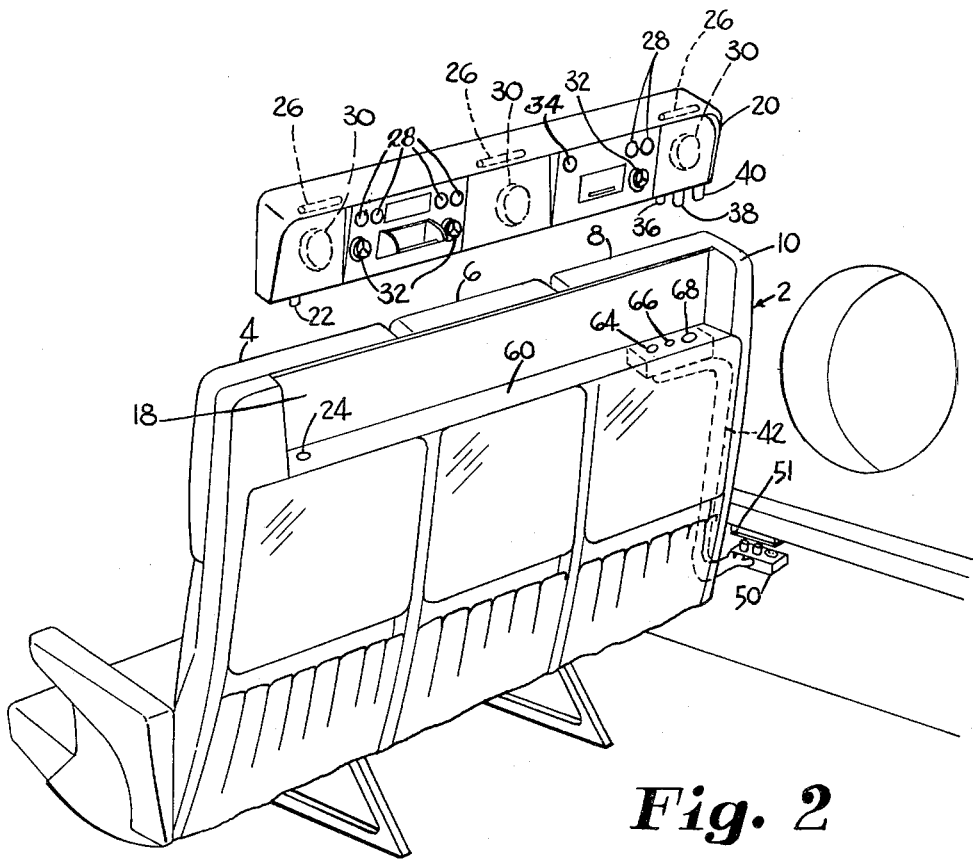
Fig. 2
Fig. 3
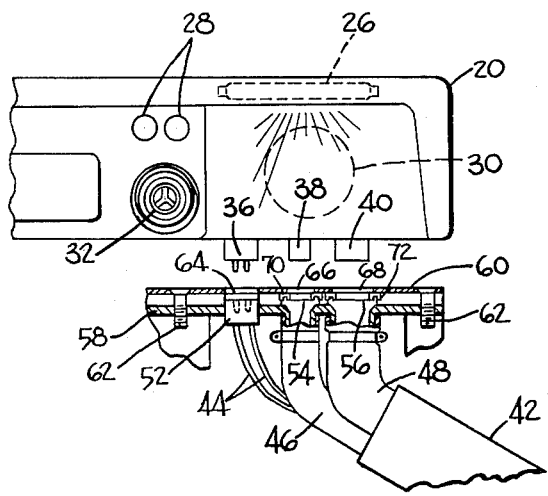
INVENTOR.
James F. Spielman.
BY
ATTORNEY

United States Patent Office 3,019,050
Patented Jan. 30, 1962

3,019,050
AIRCRAFT SEATS AND AIRCRAFT SEATING
James F. Spielman, Bantam, Conn., assignor to Aerotec Industries, Inc., Greenwich, Conn., a corporation of Connecticut
Filed Feb. 15, 1960, Ser. No. 8,853
4 Claims. (Cl. 297—217)

My invention relates to aircraft seats and aircraft seating and has for one of its objectives to provide a construction whereby the usual facilities conventionally associated with aircraft travel and customarily located in the aircraft ceiling are installed in the seat.

Customarily, the facilities referred to are reading lights, oxygen masks, air controls, etc., and, as above mentioned, they are conventionally installed in the aircraft ceiling. In my improved construction, however, the sets of facilities for the occupants of the several seats of one row of seats are installed in the multi-seat back of the next forward row of seats, and, although each occupant of this forward row of seats is free to adjust his seat to various angles of recline independently of the other occupants of the seat row, such adjustment has no effect whatsoever upon the accessibility of each set of facilities to each occupant of the next rear row of seats.

More specifically, my invention provides a "facilities unit," viz., a unit carrying sets of the facilities above mentioned as well as service switches etc., and this facilities unit I removably mount in the single multi-seat back for a row of seats so that a set of facilities is readily accessible to each occupant of the next rear row of seats. It will be understood that, if each row of seats is composed of two seats, then the facilities unit will carry two sets of facilities, and that, if each row is composed of three or more seats, the facilities unit will carry an equal number of sets of facilities. The facilities unit is so constructed that installation is accomplished by merely dropping it in place, where it will be maintained against accidental dislodgement without necessitating the use of screws, bolts, or the like. It may be latched in place, if that is found to be desirable, although even this may be found unnecessary. The removal of the facilities unit from the seat back is as simple as installation, so that repairs can be made to the unit at a point remote from the site of installation without the necessity of removing the seat back, while the replacement of the unit with another is an operation requiring but a few minutes.

The supply sources for the lights, the oxygen masks, air, etc., will, as customary, be contained in the wall of the aircraft, and the necessary connections between these supply sources and the facilities unit may readily be enclosed in a suitable conduit, equipped at its outer end with a suitable connector plug which may be plugged into outlets provided in the wall of the aircraft for the power supply, oxygen, and air. The inner ends of the tubes for conducting oxygen and air to the facilities unit take the form of female members or sockets, and the conductors for the lights will terminate in a suitable conventional socket, these socket members being attached permanently to the seat back and so positioned that, when the facilities unit is dropped in place—plugged in—all necessary connections will have been made.

The multi-seat back in which I install the facilities unit is a fixed member, and, in order that the occupants of the seats of any row may adjust their seats individually to various angles of recline without in any way affecting the accessibility of the facilities carried in the multi-seat back of that row to the occupants of the seats composing the next rear row, each seat is provided with a backrest adjustable to various angles of recline and so articulated to the seat bottom that, whenever the angle of recline of the backrest is changed, the seat bottom moves either fore or aft of the seat to maintain the proper relation between backrest and seat bottom.

From the above rather general description it will be appreciated that I have provided a particular form of seat structure and backrest adjustment so combined with a facilities installation that a decided advance is made in aircraft seating.

In the accompanying drawings, wherein I have illustrated one embodiment of my invention:

FIG. 2 is a similar view showing the facilities unit lifted out of installed position;

FIG. 3 is a fragmentary view showing in some detail the means for connecting the oxygen tube, air tube, etc., to the seat back.

Figure 1:
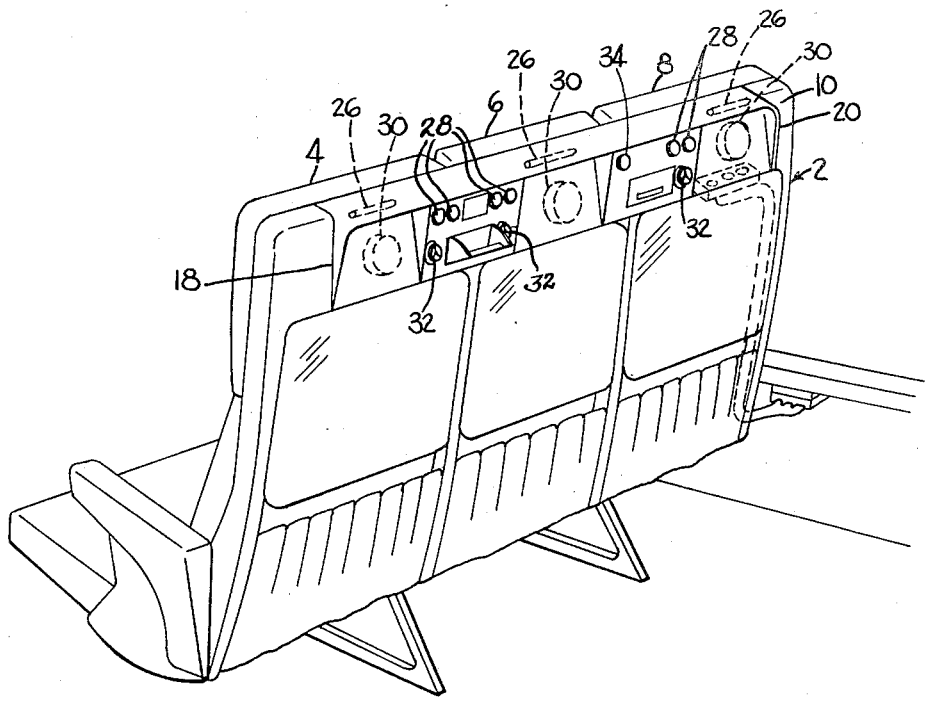
FIG. 1 is an isometric view showing my invention as applied to a multi-seat row composed of three seats, the facilities unit being shown in installed position.

Referring to the drawings in detail, 2 designates a multi-seat row of aircraft seats comprising three seats designated 4, 6, and 8, respectively. Three seats have been shown merely for illustrative purposes, as will be appreciated, the invention not being confined to any specific number of seats.

10 designates a seat back. This is a fixed member, and the one back constitutes the seat back for all three seats 4, 6, and 8.

Figure 5:
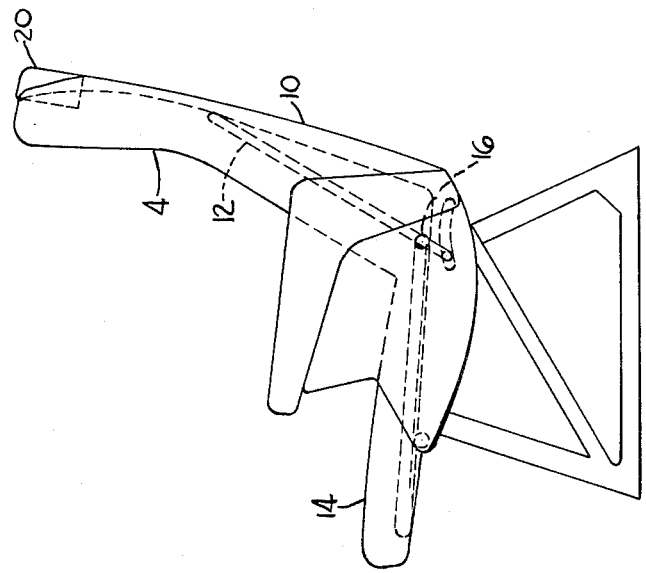
FIGS. 4 and 5 are side elevational views of the multi-seat row showing the backrest of the end seat of the row in upright position and in reclining position, respectively.
Figure 4:
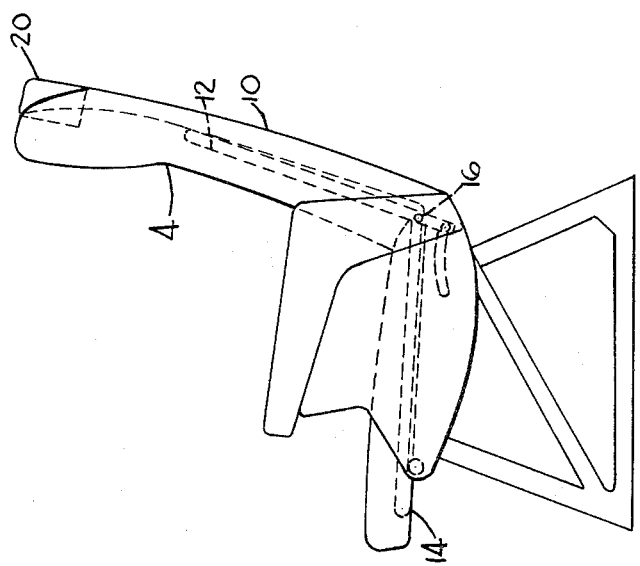

Each of the seats 4, 6, and 8 is equipped at the front of the back 10 with an adjustable backrest 12, articulated at 16 to a slidable seat bottom 14. In FIG. 4 the backrest is shown in upright position and the seat bottom 14 retracted. In FIG. 5 the seat bottom has been moved forward to recline the backrest. It will be appreciated, of course, that by this arrangement the occupant of any of the three seats can adjust his position at will and to whatever extent he may desire without disturbing the other seat occupants. It will be quite apparent also that, throughout all adjustments of the backrests and seat bottoms, the back 10, which is common to all three seats, remains in its original position.

As above set out, one of my objectives is to mount a facilities unit in the fixed seat back 10 of one multi-seat row, so that the facilities carried by this unit will always be accessible to the occupants of the next rear multi-seat row. With this in mind, I provide a pocket or recess 18 in the rear wall of the fixed seat back 10 for the reception and mounting of a facilities unit, designated 20. This unit is shaped overall so as to fit snugly into the pocket or recess 18, as illustrated in FIGS. 1 and 2, and, to facilitate its installation and prevent accidental dislodgement, it may be provided with a positioning plug 22, which is adapted to register with and enter a bore 24 provided for that purpose in the bottom of the pocket.

The facilities unit carries several sets of the desired facilities—a set for each seat occupant to be served. I have shown each set as comprising light 26, light switches 28, oxygen mask 30, and an air outlet control 32, I have chosen to show a single service call button 34, but obviously multiple call buttons may be employed if desired.

In addition to the positioning plug 22, three other plugs are affixed to and project from the bottom of the facilities unit. These are the plug 36 for the lights and call button, and hollow plugs 38 and 40 for oxygen and air, respectively.

The source of electric energy for the lights 26 and call buttons 34 and the air intake and oxygen supply for the air outlets 32 and oxygen masks 30 being mounted in the aircraft wall, suitable connections must be provided between these supply sources and the facilities unit. These connections may take the form of a flexible conduit 42, which encloses the two electric conductors 44, oxygen hose or tub 46, and air hose or tube 48. The outer end of the conduit 42 is equipped with a suitable plug 50, suitably connected to the outer ends of the conductors 44, oxygen hose or tube 46, and the air hose or tube 48, so that these elements may be plugged into an outlet 51 provided in the wall of the aircraft as easily and readily as plugging an ordinary electric appliance into a conventional electrical outlet. The inner ends of the electric conductors, oxygen hose, and air hose terminate in socket or female members 52, 54, and 56, respectively. These elements are conveniently carried by a plate 58, fastened to the bottom 60 of the pocket or recess 18 by screws 62, as illustrated in FIG. 3. The bottom of the pocket 18 is provided with bores 64, 66, and 68, registering with the sockets 52, 54, and 56.

To install the facilities unit, it is merely necessary to drop it into the pocket or recess 18, the positioning pin 22 entering the hole 24 in the pocket bottom and the plugs 36, 38, and 40 entering the sockets 52, 54, and 56, respectively. To seal the oxygen and air tubes against leaking at the sockets 54 and 56, these sockets are provided with U packing 70 and 72, respectively. Upon insertion of the plug 50 into outlet 51, installation is completed.

From all of the foregoing it will be appreciated that my invention provides an improvement in aircraft seating wherein the facilities for the occupants of a multi-seat row are mounted in the fixed back of the seats of the next forward multi-seat row, the seats of this forward multi-seat row being individually adjustable to various angles of recline without in any way affecting the accessibility of the facilities to the occupants of the seats of the next rearward multi-seat row.

It will be seen also that, inasmuch as all connections for the facilities unit are made by simply dropping the unit into the recess or pocket 18, the unit is readily removable for replacement or for repair of any malfunctioning facility without removal of the seat back 10. If found necessary, any suitable one of the many well-known quick-release latching mechanisms may be employed to secure the facilities unit in place.

It is to be understood that changes may be made in the details of construction and arrangement of parts hereinabove described within the purview of my invention.

What I claim is:

1. A multi-seat row of aircraft seats; an articulated backrest and seat bottom for each seat of the row; a fixed seat back common to the several seats of said row; and a facilities unit mounted in the rear face of said fixed back for servicing the occupants of a multi-seat row immediately to the rear of said first-mentioned row, each backrest and its articulated seat bottom being adjustable as a unit relative to said fixed back, whereby the angle of recline of the backrests can be varied independently of the facilities unit and without moving the facilities unit.

2. A multi-seat row of aircraft seats; an articulated backrest and seat bottom for each seat of the row; a fixed seat back common to the several seats of said row; a pocket or recess in the rear wall of said fixed seat back; and a facilities unit removably mounted in said pocket or recess for servicing the occupants of a multi-seat row immediately to the rear of said first-mentioned row, each backrest and its articulated seat bottom being adjustable as a unit relative to said fixed seat back, whereby the said backrests can be adjusted independently of the fixed seat backs and without moving the facilities unit.

3. A multi-seat row of aircraft seats; an articulated backrest and seat bottom for each seat of the row; a seat back common to the several seats of said row; a recess or pocket in the rear wall of said seat back; a facilities unit removably mounted in said pocket or recess, said unit comprising sets of facilities accessible to the occupants of the seats of a multi-seat row immediately to the rear of said first-mentioned row; each backrest and its articulated seat bottom being adjustable as a unit relative to said seat back, whereby the angle of recline of the backrests can be varied without altering the said accessibility of the facilities unit; means for connecting the facilities of said unit to supply sources therefor located remote from the seat back, the ends of said connecting means remote from said supply sources being in the form of socket members fixed to said seat back at the bottom of said pocket or recess and opening into the said pocket or recess; and plugs projecting from the bottom of the facilities unit in position to enter said socket members as the facilities unit is being installed in the said pocket or recess.

4. Aircraft seating comprising, in combination, two multi-seat rows of aircraft seats disposed one behind the other; an articulated backrest and seat bottom for each fixed seat; a seat back common to the several seats of the front row; and a facilities unit mounted in the rear wall of said seat back and carrying sets of facilities for servicing each seat occupant of the said rear row of seats, each backrest and its articulated seat bottom of the front row of seats being adjustable as a unit relative to said fixed seat back, so that the angle of recline of the backrests can be varied independently of the facilities unit and without moving the facilities unit.

References Cited in the file of this patent

UNITED STATES PATENTS

| | | |
|---|---|---|
| 1,291,975 | McNulty | Jan. 21, 1919 |
| 1,329,988 | Montgomery | Feb. 3, 1920 |
| 1,516,811 | Edwards | Nov. 25, 1924 |
| 1,704,415 | Wenegrat | Mar. 5, 1929 |
| 2,031,643 | Granovsky | Feb. 25, 1936 |
| 2,487,509 | Baker | Nov. 8, 1949 |
| 2,685,327 | Pitman | Aug. 3, 1954 |
| 2,879,835 | Miller | Mar. 31, 1959 |